United States Patent
Goh et al.

(10) Patent No.: US 10,471,521 B2
(45) Date of Patent: Nov. 12, 2019

(54) TWIST DRILL FOR ADVANCED MATERIALS

(75) Inventors: Wan Tsin Goh, Sheffield (GB); John Robert Limb, Chesterfield (GB)

(73) Assignee: SANDVIK INTELLECTUAL PROPERTY AB, Sandviken (SE)

( * ) Notice: Subject to any disclaimer, the term of this patent is extended or adjusted under 35 U.S.C. 154(b) by 343 days.

(21) Appl. No.: 13/643,303

(22) PCT Filed: Mar. 29, 2011

(86) PCT No.: PCT/GB2011/000478
§ 371 (c)(1),
(2), (4) Date: Oct. 25, 2012

(87) PCT Pub. No.: WO2011/135277
PCT Pub. Date: Nov. 3, 2011

(65) Prior Publication Data
US 2013/0039709 A1 Feb. 14, 2013

(30) Foreign Application Priority Data
Apr. 27, 2010 (GB) .................................. 1007032.4

(51) Int. Cl.
*B23B 51/02* (2006.01)

(52) U.S. Cl.
CPC .......... *B23B 51/02* (2013.01); *B23B 2226/27* (2013.01); *B23B 2226/36* (2013.01);
(Continued)

(58) Field of Classification Search
CPC .............. B23B 51/02; B23B 2251/046; B23B 2251/14; B23B 2251/18; B23B 2251/043; B23B 2226/27; B23B 2226/275
(Continued)

(56) References Cited

U.S. PATENT DOCUMENTS 2,334,845 A * 11/1943 Schwartz ............ B23B 51/0063
408/223
2,859,645 A * 11/1958 Emmons ................. B23B 51/02
408/230

(Continued)

FOREIGN PATENT DOCUMENTS

DE 102006032005 A1 1/2008
EP 0642863 A1 3/1995
(Continued)

OTHER PUBLICATIONS

Translation of FR 2656554 A1.*

*Primary Examiner* — Sunil K Singh
*Assistant Examiner* — Paul M Janeski
(74) *Attorney, Agent, or Firm* — Corinne R. Gorski

(57) ABSTRACT

The present invention is concerned with twist drills for drilling of composite materials such as carbon fibre reinforced plastic (CFRP) and glass fibre reinforced plastic (GFRP). The present invention proposes that a twist drill (2) is provided with a variable helix having a defined start and finish helix angle, in combination with primary and secondary relief angles such that the drill (2) is adapted to minimise thrust force, particularly when used for drilling fibre-containing composite materials and especially for hand drilling. Start and finish helix angles of 50° and 10°; 50° and 30°; and 30° and 10° have been shown to provide excellent cutting performance and exit hole quality. A large secondary chisel edge angle (24) has also been found to contribute to excellent performance with composite materials, including stack machining.

31 Claims, 7 Drawing Sheets

(52) U.S. Cl.
CPC ..... *B23B 2251/046* (2013.01); *B23B 2251/14* (2013.01); *B23B 2251/18* (2013.01); *B23B 2251/606* (2013.01); *Y10T 408/03* (2015.01); *Y10T 408/906* (2015.01); *Y10T 408/9097* (2015.01)

(58) Field of Classification Search
USPC ................................. 408/1 R, 230, 227, 229
See application file for complete search history.

(56) References Cited

U.S. PATENT DOCUMENTS

| | | | | |
|---|---|---|---|---|
| 3,779,664 | A | * | 12/1973 | Caley ................... B23B 51/02 408/225 |
| 4,231,692 | A | * | 11/1980 | Brabetz et al. ............... 408/230 |
| 4,936,721 | A | * | 6/1990 | Meyer ................... B23B 51/08 408/224 |
| 5,800,101 | A | | 9/1998 | Jindai |
| 6,652,203 | B1 | | 11/2003 | Risen |
| 7,520,703 | B2 | * | 4/2009 | Rompel ..................... 408/225 |
| 2003/0053873 | A1 | * | 3/2003 | Shaffer ....................... 408/230 |
| 2003/0161697 | A1 | * | 8/2003 | Lui et al. ...................... 408/230 |
| 2004/0191016 | A1 | * | 9/2004 | Hintze et al. .................. 408/67 |
| 2008/0019787 | A1 | | 1/2008 | Sampath et al. |
| 2008/0131221 | A1 | * | 6/2008 | Yanagida et al. ............... 408/59 |
| 2009/0087275 | A1 | * | 4/2009 | Goulbourne ................. 408/230 |

FOREIGN PATENT DOCUMENTS

| | | | | |
|---|---|---|---|---|
| EP | 0681882 | A | 11/1995 | |
| FR | 2656554 | A1 * | 7/1991 | ............. B23B 51/02 |
| JP | S57071714 | | 5/1982 | |
| JP | 63099123 | A | 4/1988 | |
| JP | H02122712 | U | 10/1990 | |
| JP | H04502884 | | 5/1992 | |
| JP | H07112311 | | 5/1995 | |
| JP | 2000084721 | | 3/2000 | |
| JP | 2001079707 | A | 3/2001 | |
| WO | 199835777 | A1 | 8/1998 | |
| WO | 2006120654 | A2 | 11/2006 | |

* cited by examiner

TWIST DRILL FOR ADVANCED MATERIALS

RELATED APPLICATION DATA

This application is a § 371 National Stage Application of PCT International Application No. PCT/GB2011/000478 filed Mar. 29, 2011 claiming priority of Great Britain Application No. 1007032.4, filed Apr. 27, 2010.

TECHNICAL FIELD OF THE INVENTION

The present invention relates to twist drills and in particular twist drills adapted for drilling, especially hand drilling, of composite materials such as carbon fibre reinforced plastic (CFRP) or glass fibre reinforced plastic (GFRP).

BACKGROUND

Fibre-containing composite materials such as CFRP and GFRP represent a particular challenge, especially in terms of good hole quality. Furthermore, in the aerospace industry especially, these materials are often drilled by hand, rather than by automated drilling because the workpiece (e.g. component or panel) may not be accessible to the arm of an automated drilling apparatus.

Unlike automated drilling where the drilling is computer controlled (i.e. drill speed and drill feed rate), hand drilling requires the user to control the speed and feed. Thus, whilst damage to the workpiece (e.g. composite material) can be moderated in the case of automated drilling by control of drill speed and feed rate, in hand drilling, damage to the workpiece is dependent on the operator, namely the speed and feed applied to the workpiece. Hence, hand drilling brings with it the difficulty of producing uniform holes: different users may apply different levels of force to the workpiece and so hole quality can vary.

Hand drilling is also more susceptible to the problem of "pushing" or "pull through", whereby a drill can exert an axial force on the user at particular points during drilling of a hole. This arises from the interaction of the drill and the workpiece as the drill moves into and through the workpiece. This makes it difficult for the user to control the drilling process and can lead to reduced hole uniformity and hole quality.

Commercially available drills that are suggested for use with CFRP-type materials and the like are drill reamers, particularly four-flute drill reamers. However, these are unable to provide a variable level of thrust force and good exit hole quality.

SUMMARY OF THE INVENTION

The drills described herein seek to address the problems described above. In particular, embodiments described herein ameliorate the problems of thrust force and hole quality when drilling fibre-containing composite materials such as CFRP and GFRP.

A first proposal is that a twist drill is provided with a variable helix having a defined start and finish helix angle, in combination with primary and secondary relief angles such that the drill is adapted to minimise thrust force, particularly when used for drilling fibre-containing composite materials and especially for hand drilling.

A second proposal is that a twist drill is provided with a secondary chisel edge, in combination with primary and secondary relief angles such that the drill is adapted to provide good hole quality, particularly when used for drilling fibre-containing composite materials and especially for hand drilling.

A third proposal is that a twist drill having a variable helix is used to drill a fibre-containing composite material.

A fourth proposal is that a twist drill is provided with a helix comprising both a linear portion and a variable helix portion, with defined start and finish helix angles, in combination with a secondary chisel angle such that the drill is adapted to provide good hole quality, particularly when used for drilling fibre-containing composite materials.

Each of these proposals is discussed in turn.

The terms 'forward' and 'rearward' as used herein are intended only to assist in the understanding of the structural features of the twist drill. They are not intended to be a reference or limitation to the drill in use.

In respect of the first proposal, the problem of thrust force when drilling composite materials containing fibres is addressed by combining a number of drill geometry features, namely a variable helix with specified start and finish angles, and primary and secondary facets (primary and secondary clearances or reliefs) with specified relief angles.

In a first aspect, the present invention provides a twist drill having
  a shank,
  a drill body,
  a drill tip comprising a cutting edge, a primary facet extending behind the cutting edge and a secondary facet extending behind the primary facet, wherein the relief angle of the primary facet is 5° to 40°, preferably 10° to 40°, and the relief angle of the secondary facet is 10° to 40°; and
  at least one flute extending from the drill tip to the drill body, wherein the helix angle of the or each flute decreases from a start helix angle of 25° to 60°, preferably 40° to 60°, at the drill tip to a finish helix angle of 0° to 35°, preferably 0° to 20°, in the drill body.

The present inventors have found that the combination of a variable helix as defined above and the provision of primary and secondary facets clearance significantly reduces the thrust force, particularly when drilling composite material containing fibres. Indeed, as described herein, embodiments have achieved good exit hole quality when drilling composite materials containing fibres, for example epoxy based CFRP. Indeed, the drill of this aspect is adapted for drilling such composite materials. In embodiments, the drill is a composite twist drill.

Nevertheless, the drill can be used for drilling other materials, for example steel and aluminium.

The helix is therefore a variable helix. That is, the helix angle changes from the drill tip to the drill body. In particular, the helix angle at the drill tip (the start angle) is comparatively large, at 25° to 60°, preferably 40° to 60°, which angle reduces to a comparatively low value of 0° to 35°, preferably 0° to 20°, in the drill body (the finish angle).

In particular, the present inventors have identified a variable helix having a start helix angle at the drill tip of 25° to 60°, preferably 40° to 60°, and a finish helix angle in the drill body of 0° to 35°, preferably 0° to 20°, as especially suitable for reducing thrust force. A lower thrust force reduces the risk of delamination and also reduces power consumption.

Furthermore, the comparatively large start angle assists in engaging quickly with the substrate that is being drilled. In practice, embodiments rapidly and cleanly cut into a composite material containing fibres. The large start angle provides a low cutting resistance.

The comparatively small finish angle suitably increases cutting resistance and, particularly relevant to hand drilling, preferably reduces the "pull through" effect.

The combination of the specified start and finish angles therefore provides the drill with characteristics that are particularly suited to drilling of composite materials as described herein.

As described herein, the present inventors have found that a wide range of combinations of start and finish angles can be used within the ranges specified above, for example 50° to 10°, 30° to 10°, and 50° to 30°, with valuable practical advantages being demonstrated by these embodiments.

Suitably the upper limit for the start angle is 58°, preferably 56°, more preferably 55°, more preferably 54°, more preferably 53°, more preferably 52°, and most preferably 51°.

In some embodiments the upper limit of the start angle is 34°, preferably 32° and most preferably 31°.

Suitably the lower limit for the start angle is 42°, preferably 44°, more preferably 45°, more preferably 46°, more preferably 47°, more preferably 48° and most preferably 49°.

In some embodiments the lower limit for the start angle is 26°, preferably 27°, more preferably 28°, more preferably 29° and most preferably about 30°. The lower limit can also be 35° or 40°.

These values for the upper and lower limits for the start angle can be present in embodiments in any combination.

A particularly preferred start angle is 45° to 55°, more preferably 48° to 52°, more preferably 49° to 51° and most preferably about 50°.

Suitably the lower limit for the finish angle is 2°, preferably 4°, more preferably 6°, more preferably 8° and most preferably 9°.

In some embodiments, particularly those where the drill is adapted for automated drilling, typically the lower limit for the finish angle is considerably larger, preferably 15°, more preferably 20°, more preferably 22°, more preferably 24°, more preferably 26° and most preferably 28°.

Suitably the upper limit for the finish angle is 34°, preferably 33°, more preferably 32° and most preferably 31°. In some embodiments the upper limit for the finish angle is 20°, preferably 18° and most preferably 16°.

In some embodiments, particularly those where the drill is adapted for hand drilling, typically the upper limit for the finish angle is considerably smaller, preferably 14°, more preferably 13°, more preferably 12° and most preferably 11°.

These values for the upper and lower limits for the finish angle can be present in embodiments in any combination. A particularly preferred combination is 0° to 32°, more preferably 6° to 32°, more preferably 8° to 32°, and most preferably 9° to 31°.

Another preferred combination is 0° to 20°, more preferably 0° to 18° and most preferably 0° to 16°.

In some embodiments, particularly those adapted for hand drilling, preferably the finish angle is 6° to 12°, preferably 8° to 12°, more preferably 9° to 12°, more preferably 9° to 11° and most preferably about 10°.

In some embodiments, particularly those adapted for automated drilling, preferably the finish angle is 20° to 35°, more preferably 20° to 35°, more preferably 25° to 35°, more preferably 27° to 33°, more preferably 28° to 32°, more preferably 29° to 31° and most preferably about 30°.

These ranges and values for the start angle and finish angle can be present in embodiments in any combination.

In preferred embodiments the helix has a start angle of 28° to 52° and a finish angle of 8° to 12°. Especially preferred embodiments have a start angle of either (i) 28° to 32° or (ii) 48° to 52°; and a finish angle of 8° to 12°.

In particularly preferred embodiments, the helix has a start angle of 48° to 52° and a finish angle of 8° to 12°. An especially preferred embodiment has a start angle of about 50° and a finish angle of about 10°.

In other particularly preferred embodiments the helix has a start angle of 28° to 32° and a finish angle of 8° to 12°. An especially preferred embodiment has a start angle of about 30° and a finish angle of about 10°.

In other particularly preferred embodiments, the helix has a start angle of 48° to 52° and a finish angle of 28° to 32°. An especially preferred embodiment has a start angle of about 50° and a finish angle of about 30°.

Preferably the helix angle decreases by at least 5° from start helix angle to finish helix angle, more preferably by at least 10°, more preferably by at least 15°, more preferably by at least 20°, more preferably by at least 25°, more preferably by at least 30° and most preferably by at least 35°.

Particularly in the case of embodiments that are adapted for hand drilling, suitably the helix angle decreases by at least 35°, preferably at least 38° and preferably about 40°. In these embodiments, suitably the helix angle does not decrease more than 50°, preferably no more than 45°.

Particularly in the case of embodiments that are adapted for automated drilling, suitably the helix angle decreases by at least 15°, preferably at least 18° and preferably about 20°. In these embodiments, suitably the helix angle does not decrease more than 40°, preferably no more than 35°.

In embodiments, the helix angle decreases continuously from the start helix angle to the finish helix angle. Thus, suitably, the helix does not include any linear portions where the helix angle does not change. Preferably the rate of change of helix angle as a function of distance along the helix varies continuously. Thus, suitably the helix does not include any portions where the rate of change of the helix angle is constant. Preferably the helix angle decreases following a non-linear function, suitably a curve function, for example an exponential function. Especially preferred is that the helix angle decreases following a spline function from the start helix angle to the finish helix angle. Suitably the spline function is any non-linear spline function, for example exponential, quadratic or cubic spline function.

Suitably the lead of the drill changes to accommodate the change in helix angle. For example, the lead changes in accordance with a spline function In embodiments, the at least one flute includes one or more linear portions where the helix angle does not change. That is, the flute includes (i) a linear portion where the helix angle does not change, and (ii) a variable or non-linear portion where the helix angle decreases as described herein.

In embodiments where the flute comprises a linear portion (helix angle is constant) suitably the length of the linear portion is at least 5% of the total length of the flute, more preferably at least 10%, more preferably at least 15% and most preferably at least 20% of the total length of the flute.

Preferably the length of the linear portion is no more than 50% of the total length of the flute, preferably no more than 40% of the total length of the flute, more preferably no more than 30% of the total length of the flute and most preferably no more than 20% of the total length of the flute.

Suitably the linear portion is at the start of the flute (i.e. at the drill tip). Preferably the flute comprises a start portion that is a linear portion and a finish portion that is a variable portion. Suitably in the variable portion the rate of change of helix angle as a function of distance along the helix varies continuously. This has been found to assist in achieving good hole quality and to reduce thrust force. In particular, suitably the large helix helps to produce good hole quality, reduce thrust and to produce excellent hole size.

A smaller finish helix angle is particularly effective when the drill includes a wider diameter chamfered portion ("chamfer drill"), so as to avoid potential weakening of the chamfer portion.

The provision of primary and secondary reliefs has been found to contribute to the reduction in thrust force. In particular, the combination of a primary relief angle and a secondary relief angle as described herein has been found to provide a thrust force that is suitable for drilling of composite material in particular.

Furthermore, the primary and secondary relief angles have been found to improve heat release at the drill tip. This has been found not only to assist with the reduction of thrust force but also to improve hole quality, especially exit hole quality when drilling composite material as described herein. In particular, experiments conducted by the inventors have shown that less splintering of composite material substrates is observed.

Preferably the primary relief angle is at least 8°, preferably at least 10°, preferably at least 12° and more preferably at least 14°.

In embodiments, particularly embodiments adapted for hand drilling, the primary relief angle is suitably at least 15°, preferably at least 20°, more preferably at least 22°, more preferably at least 23° and most preferably at least 24°.

Preferably the primary relief angle is no more than 35°, more preferably no more than 30°, more preferably no more than 28°, more preferably no more than 27°, and most preferably no more than 26°.

In embodiments, particularly embodiments adapted for automated drilling, the primary relief angle is suitably no more than 19°, more preferably no more than 18°, more preferably no more than 17° and most preferably no more than 16°. In other embodiments, the primary relief angle is no more than 14°, preferably no more than 12°.

In embodiments, particularly embodiments adapted for automated drilling, suitably the primary relief angle is 11° to 19°, preferably 12° to 18°, more preferably 13° to 17°, more preferably 14° to 16° and most preferably about 15°.

In embodiments, particularly embodiments adapted for hand drilling, suitably the primary relief angle is 21° to 29°, preferably 22° to 28°, more preferably 23° to 27°, more preferably 24° to 26° and most preferably about 25°.

In embodiments, suitably the primary relief angle is 5° to 16°, preferably 8° to 12° and most preferably about 10°.

Preferably the secondary relief angle is at least 12°, more preferably at least 14°, more preferably at least 15°, more preferably at least 16°, more preferably at least 17°, more preferably at least 18° and most preferably at least 19°.

Preferably the secondary relief angle is no more than 35°, more preferably no more than 30°, more preferably no more than 28°, more preferably no more than 26°, more preferably no more than 25°, more preferably no more than 24°, more preferably no more than 23°, more preferably no more than 22° and most preferably no more than 21°.

In embodiments, particularly embodiments adapted for automated drilling or embodiments adapted for hand drilling, suitably the secondary relief angle is 15° to 25°, preferably 16° to 24°, more preferably 17° to 23°, more preferably 18° to 22°, more preferably 19° to 21° and most preferably about 20°.

These ranges and values (including upper and lower limits) for the primary relief angle and secondary relief angle can be present in embodiments in any combination.

In particularly preferred embodiments, especially those adapted for hand drilling, the primary relief angle is 23° to 27° and the secondary relief angle is 17° to 23°, and even more preferably 24° to 26° and 19° to 21°.

In other particularly preferred embodiments, especially those adapted for automated drilling, the primary relief angle is 13° to 17° and the secondary relief angle is 18° to 22°, and even more preferably 14° to 16° and 19° to 21°.

Suitably the drill has only 2 flutes. However, more than 2 flutes are also possible, for example 3 or 4 flutes. In embodiments, 2 or 3 flutes, preferably only 2 or 3 flutes are preferred.

Preferably the drill includes a pilot. Thus, in embodiments, the drill tip comprises a pilot, which is also known as a centring tip. It has been found that a pilot further improves drill performance, particularly in respect of thrust force. The pilot has been found to be particularly effective when the drill is a hand drill. The pilot suitably assists in accurately locating a hole.

Surprisingly, the present inventors have found that a pilot having a length of at least 2 mm is particularly effective. Preferably the pilot has a length of at least 2.5 mm, more preferably at least 3 mm. Particularly preferred pilot lengths are 2 mm to 6 mm, more preferably 2 mm to 5 mm, more preferably 2.5 mm to 5 mm, more preferably 2.5 mm to 4.5 mm, more preferably 2.5 mm to 4 mm, more preferably 2.5 mm to 3.5 mm and most preferably about 3 mm. In particular, an extended pilot has been found to assist considerably in the formation of uniform holes, especially hand drilled holes.

Suitably the diameter of the pilot is 40% to 60% of the diameter of the drill diameter, preferably 42% to 52%, more preferably 44% to 50%, more preferably 46% to 48% and most preferably about 47%.

Generally, the drill diameter is the diameter over the margins (if present) of a drill measured at the point, i.e. at the widest point of the drill. When the drill comprises a pilot, the drill diameter is also measured at the widest part of the drill body, typically at the forwardmost end of the drill body. In embodiments where there is a transition portion between the drill body and the pilot, the drill diameter is the diameter at the drill body immediately adjacent the transition portion (e.g. immediately adjacent the second chamfer portion).

A further advantage of providing the drill with a pilot is that the drill can be reground to permit re-use of the drill. Specifically, the drill tip comprising the pilot can be reground. Thus, in embodiments, the drill is a regrindable drill. Suitably the drill is capable of being reground at least twice, for example two times or three times. That is, preferably the drill can be subjected to regrinding at least once, preferably at least twice.

Where a pilot is present, the present inventors have found that further improvements in performance, for example improvements in thrust force, can be achieved if the drill is provided with a double chamfer.

Preferably the drill includes a transition portion between the pilot and the drill body, the transition portion having a first chamfer portion extending behind the pilot, and a second chamfer portion extending behind the first chamfer portion.

The provision of a double chamfer has been found to improve the cutting transition between the tip and drill body.

Preferably the transition portion has a length of at least 5 mm, more preferably at least 6 mm, more preferably at least 7 mm, and most preferably at least 8 mm, The length of the transition portion is the length in the axial direction.

Preferably the transition portion has a length of no more than 25 mm, more preferably no more than 22 mm, more preferably no more than 20 mm, more preferably no more than 18 mm, more preferably no more than 16 mm, more preferably no more than 14 mm, more preferably no more than 12 mm and most preferably no more than 10 mm.

Suitably the first chamfer portion has a length of at least 3 mm, preferably at least 4 mm. The length of the chamfer portion is length in the axial direction.

Suitably the first chamfer portion has a length of no more than 20 mm, preferably no more than 15 mm, more preferably no more than 10 mm, more preferably no more than 8 mm, and most preferably no more than 6 mm.

Suitably the first chamfer portion has a length of 4 mm to 6 mm, preferably 4.5 mm to 5.5 mm and most preferably about 5 mm.

Suitably the second chamfer portion has a length of at least 2 mm, preferably at least 3 mm. The length of the chamfer portion is length in the axial direction.

Suitably the second chamfer portion has a length of no more than 20 mm, preferably no more than 15 mm, more preferably no more than 10 mm, more preferably no more than 8 mm, and most preferably no more than 6 mm.

Suitably the second chamfer portion has a length of 3 mm to 5 mm, preferably 3.5 mm to 4.5 mm, and most preferably about 4 mm.

Suitably the length of the first chamfer portion is greater than the length of the second chamfer portion. Preferably the first chamfer portion is at least 10% longer than the second chamfer portion, more preferably at least 15% longer and most preferably about 20% longer. However, in other embodiments, the length of the first chamfer portion can be shorter than the length of the second chamfer portion.

In particularly preferred embodiments, the first chamfer portion has a length of about 5 mm and the second chamfer portion has a length of about 4 mm.

In embodiments, the second chamfer portion angle is no more than 80°.

Suitably the second chamfer portion angle is 5° to 15°, preferably 7° to 13°, more preferably 8° to 12°, more preferably 9° to 11° and most preferably about 10°. The chamfer angle is the angle formed by the plane of the chamfer and a plane parallel to the drill axis.

In embodiments, the first chamfer portion angle is no more than 80°.

The first chamfer portion angle is suitably 10° to 20°, preferably 12° to 18°, more preferably 13° to 17°, more preferably 14° to 16° and most preferably about 15°.

Suitably the first chamfer portion angle is larger than the second chamfer portion angle. Preferably the first chamfer portion angle is at least 20% larger than the second chamfer portion angle, more preferably at least 30% larger, more preferably at least 40% larger, and most preferably about 50% larger.

In particularly preferred embodiments, the first chamfer portion angle is about 15° and the second chamfer portion angle is about 10°.

By providing a double chamfer as described herein, the present inventors have found that the cutting resistance experienced when hand drilling composite materials described herein can be adjusted so as to reduce or minimise the fast feed or the "pushing" effect. In particular, suitably the cutting resistance is increased by the provision of a double chamfer and this can counteract the "pushing" effect caused by transition from the point (or first chamfer portion) and the drill body. In embodiments, increasing the cutting resistance provides a more favourable cutting transition from pilot/first chamfer portion to drill body, so that smooth cutting can take place. This is in contrast to a sudden "push", which can occur if only one steep chamfer is used. In particular, where the presence of only a single chamfer requires a steep chamfer angle, the steep angle at the chamfer will cause the pushing effect in drilling when the drill's engagement on the workpiece moves from the chamfer to the drill diameter.

In some embodiments the twist drill has a triple chamfer, i.e. first, second and third chamfer portions. This has been found to be particularly advantageous for smaller diameter and larger diameter drills, especially for twist drills having a diameter of less than 4 mm or at least 11.5 mm.

Suitably the drill tip comprises a chisel edge. Preferably the chisel edge angle is 100° to 125°, more preferably 105° to 120°.

In embodiments, particularly those adapted for hand drilling, the chisel edge angle is 105° to 115°, more preferably 107° to 113°, more preferably 109° to 111°, and most preferably about 110°.

In embodiments, particularly those adapted for automated drilling, the chisel edge angle is 110° to 120°, more preferably 112° to 119°, more preferably 114° to 118°, more preferably 115° to 117° and most preferably about 116°.

A comparatively large chisel edge angle as described herein has been found to assist in reducing thrust force.

Preferably the chisel edge length is 0.03 mm to 0.15 mm, more preferably 0.05 mm to 0.15 mm, more preferably 0.06 mm to 0.14 mm, more preferably 0.07 mm to 0.13 mm, more preferably about 0.08 mm to 0.12 mm, more preferably about 0.09 mm to 0.11 mm and most preferably about 0.1 mm.

A comparatively small chisel edge length as described herein has been found to assist in reducing thrust force.

Where the drill has only two flutes, the above chisel edge lengths are particularly preferred.

In embodiments where the drill has 3 flutes, it is preferred that the chisel edge length is 0.03 mm to 0.07 mm, more preferably 0.03 to 0.06 mm and most preferably 0.03 mm to 0.05 mm.

Preferably the drill tip comprises a secondary chisel edge. The present inventors have found that a second chisel edge surprisingly provides improvements in the cutting action by reducing the cutting resistance. This is particularly advantageous in hand drilling.

Suitably the secondary chisel edge angle is larger than the chisel edge angle, preferably at least 20% larger, more preferably at least 30% larger, more preferably at least 35% larger and most preferably at least 40% larger.

Preferably the secondary chisel edge angle is at least 120°, more preferably at least 125° and most preferably at least 130°.

In embodiments, particularly those adapted for hand drilling, preferably the secondary chisel edge angle is at least 142°, more preferably at least 144°, more preferably at least 145°, more preferably at least 146°, more preferably at least 147°, more preferably at least 148° and most preferably at least 149°.

In embodiments, particularly those adapted for automated drilling, preferably the secondary chisel edge angle is at least 132°, more preferably at least 134°, more preferably at least 135°, more preferably at least 136°, more preferably at least 137°, more preferably at least 138° and most preferably at least 139°.

Preferably the secondary chisel edge angle is no more than 170°, most preferably no more than 160°.

In embodiments, particularly those adapted for hand drilling, preferably the secondary chisel angle is no more than 158°, more preferably no more than 156°, more preferably no more than 155°, more preferably no more than 154°, more preferably no more than 153°, more preferably no more than 152° and most preferably no more than 151°.

In embodiments, particularly those adapted for automated drilling, preferably the secondary chisel angle is no more than 148°, more preferably no more than 146°, more preferably no more than 145°, more preferably no more than 144°, more preferably no more than 143°, more preferably no more than 142° and most preferably no more than 141°.

These values (upper and lower limits) for the secondary chisel edge angle can be present in embodiments in any combination.

Suitably the secondary chisel edge angle is 120° to 170°, preferably 130° to 160°, and most preferably 135° to 155°.

In embodiments, particularly those adapted for hand drilling, preferably the secondary chisel angle is 140° to 165°, preferably 140° to 160°, more preferably 145° to 155°, more preferably 147° to 153°, more preferably 148° to 152°, more preferably 149° to 151° and most preferably about 150°.

In embodiments, particularly those adapted for automated drilling, preferably the secondary chisel angle is 130° to 155°, preferably 130° to 150°, more preferably 135° to 145°, more preferably 137° to 143°, more preferably 138° to 142°, more preferably 139° to 141° and most preferably about 140°.

By providing a secondary chisel edge as described herein, the present inventors have found that hole quality, especially exit hole quality, in composite materials described herein can be improved considerably. In particular, the provision of a large secondary chisel edge angle has been found to improve the cutting action of the drill, for example by reducing the cutting resistance.

Suitably the drill tip includes 2 or more cutting edges (e.g. 2, 3, 4, 5, or 6 cutting edges). Preferably there are only 2 cutting edges, i.e. primary and secondary cutting edges. For example, the primary and secondary cutting edges shown in FIG. 1 form the point.

The terms 'point' and 'point angle' are familiar to the person skilled in the art, as is the fact that point angles are regarded as positive, by convention. For example the point angle of an embodiment of the present invention is shown as feature 12 in FIG. 1. For the avoidance of doubt the point angle is the included angle between the primary and secondary cutting edges projected upon a plane parallel to the drill axis and parallel to the two cutting edges.

Suitably the drill has a point angle of at least 80°, preferably at least 82°, more preferably at least 84°, more preferably at least 85°, more preferably at least 86°, more preferably at least 87°, more preferably at least 88° and most preferably at least 89°.

Suitably the drill has a point angle of no more than 140°, preferably no more than 130°, more preferably no more than 120°, more preferably no more than 115°, more preferably no more than 110°, more preferably no more than 105°, more preferably no more than 100°, more preferably no more than 98°, more preferably no more than 96°, more preferably no more than 95°, more preferably no more than 94°, more preferably no more than 93°, more preferably no more than 92° and most preferably no more than 91°.

These values (upper and lower limits) for the point angle can be present in embodiments in any combination.

A particularly preferred point angle is 80° to 140°, more preferably 80° to 130°, more preferably 80° to 120°, more preferably 80° to 110°, more preferably 85° to 110°, more preferably 85° to 105°, more preferably 85° to 100°, more preferably 85° to 95°, more preferably 86° to 94°, more preferably 87° to 93°, more preferably 88° to 92°, more preferably 89° to 91° and most preferably about 90°.

In embodiments, particularly those adapted for automated drilling, the point angle is 80° to 90°, more preferably 82° to 88°, more preferably 83° to 87°, more preferably 84° to 86° and most preferably about 85°.

The present inventors have found that a point angle as described herein assists in reducing thrust force and/or producing good exit hole quality.

Suitably the drill tip has an axial rake angle at splitting or thinning of at least 3°, preferably at least 4°, more preferably at least 5°, more preferably at least 6°, more preferably at least 7°, more preferably at least 8° and most preferably at least 9°.

Suitably the rake angle is no more than 20°, preferably no more than 15°, more preferably no more than 14°, more preferably no more than 13°, more preferably no more than 12° and most preferably no more than 11°.

In embodiments, particularly those adapted for automated drilling, the axial rake angle is no more than 10°, more preferably no more than 8°, and most preferably no more than 6°.

A particularly preferred axial rake angle is 3° to 15°, more preferably 4° to 15°, more preferably 5° to 15°, more preferably 6° to 15°, more preferably 7° to 13°, more preferably 8° to 12°, more preferably 9° to 11° and most preferably about 10°.

In embodiments, particularly those adapted for automated drilling, the axial rake angle is 3° to 11°, more preferably 4° to 8°, more preferably 4° to 6° and most preferably about 5°.

The present inventors have found that an axial rake angle as described herein can reduce or minimise the amount of heat generated during cutting, thereby assisting the formation of good quality exit holes.

In embodiments the twist drill comprises a back edge relief. That is, a rearward (back edge) portion of the fluted land is removed so as to provide a relief. An example of a back edge relief is feature 220 in FIG. 6. This has been found to assist in the cooling of the twist drill and in particular to prevent overheating and hence melting of composite materials during drilling.

It is particularly preferred that a back edge relief is provided on twist drills having a diameter of at least 7.8 mm (e.g. 7.8 mm to 15 mm).

Suitably the twist drill has a back edge relief associated with each fluted land, typically associated with each cutting edge. Thus, suitably, where there are 2 or 3 cutting edges there are 2 or 3 back edge reliefs, one associated with each cutting edge.

Where a transition portion (comprising for example one, two or three chamfer portions) is present it is preferred that the back edge relief extends beyond the transition portion (chamfer portion(s)) into the drill body. For example, the back edge relief may extend 2 mm to 12 mm, preferably 6 mm to 10 mm, more preferably 8 mm to 9 mm into the drill body.

In embodiments, particularly those adapted for automated drilling, the drill body comprises a wider diameter portion adjacent the shank. Thus, suitably the drill body comprises a first portion and, adjacent the shank, a second portion wherein the diameter of the second portion is larger than the diameter of the first portion.

Suitably the drill body comprises a chamfer between the first and second portions, to provide a smooth transition between first and second portions. In the art, a wider diameter portion with such a chamfer may be referred to as a chamfer portion and drills comprising such a feature may be referred to as chamfer drills.

Suitably the flute extends into the second or wider diameter portion. Suitably the part of the flute in the second or wider diameter portion is a variable helix as described herein.

The drill can comprise a right hand or a left hand helix. A right hand helix is preferred.

Preferably the drill is a hand drill.

Preferably the twist drill has a diameter in the range 1 mm to 50 mm, preferably 1 to 20 mm, more preferably 1 mm to 15 mm, and most preferably 2 mm to 15 mm.

Suitably, for twist drills having a diameter of 6.5 mm or more (e.g. 6.5 mm to 15 mm), the start helix angle is less than 40°, preferably in the range 28° to 32°; and the finish helix angle is in the range 0° to 20°, preferably 8° to 12°. Suitably the helix angle decreases by at least 10°, preferably at least 15°. Suitably the twist drill has 3 flutes, preferably at least 3 flutes.

Suitably, for twist drills having a diameter of less than 6.5 mm (e.g. 2 mm to <6.5 mm), the start helix angle is at least 40°, preferably in the range 48° to 52°; and the finish helix angle is in the range 0° to 35°, preferably 8° to 12°. Suitably the helix angle decreases by at least 20°, preferably at least 30° and most preferably at least 35°. Suitably the twist drill has only 2 flutes.

Preferably the twist drill is made of carbide. A preferred carbide is tungsten carbide (WC). Another preferred carbide is binderless carbide. Alternative materials of construction include high speed steel (HSS), HSCo and HSCoXP, silicon nitride and PCD (polycrystalline diamond), or combinations thereof (for example PCD mounted on a metal or carbide substrate, e.g. mounted on a HSS or carbide substrate), and any diamond impregnated substrates such as tungsten carbide and silicon carbide.

In the case of a carbide twist drill, preferably the carbide is a cemented carbide. Suitably the metal matrix is cobalt. That is, a carbide cobalt. Preferably the twist drill is made of tungsten-carbide cobalt. A particularly preferred concentration of cobalt is 3 wt % to 10 wt % cobalt based on weight of the total cemented carbide, more preferably 5 wt % to 7 wt % and most preferably about 6 wt %. In other embodiments, 10 wt % is preferred.

Preferably the twist drill is coated. The twist drill can be partially or fully coated. Preferably the coating is a wear resistant coating, suitably having a lower coefficient of friction than the uncoated tool.

Suitable coatings include metal nitride based coating (e.g. TiN, AlxTiyN, etc.), metal oxide based coating (e.g. AlxO, AlxCryO, etc.), carbon based coating (e.g. DLC, Diamond Coating, etc.) and combinations thereof.

Diamond coating is preferred.

In other embodiments, the drill is bright (uncoated).

Without wishing to be bound by theory, the present inventors believe that the improvements in hole quality referred to herein are achieved, at least in part, by reducing the generation and/or build-up of heat at the drilling site. Excess heat causes the matrix of a composite material (typically a resin matrix) to soften or melt, which in turn permits the fibres in the composite to move or even separate from the matrix. This process can result in damage to the fibres and fraying of the composite material. In the context of laminate materials, this can also result in delamination.

For example, the present inventors have found that significant amounts of heat can be released by the use of the primary and secondary relief angles as described herein.

Indeed, as discussed below in more detail, embodiments of the present invention have required only low thrust force, thereby reducing the incidence of material delamination and reducing power consumption. Furthermore, excellent entry and exit hole quality has been achieved, particularly when cutting CFRP, with both twill fibre or uni-directional fibre layout, as well as materials with a glass cloth on the exit face. This a particularly important contribution to the art because uni-directional type materials and those with a glass cloth on the exit face are notoriously difficult to drill and poor hole quality is the norm with conventional drills.

In respect of the second proposal, the problem of hole quality, especially exit hole quality, is addressed by combining a number of geometry features, namely a secondary chisel edge with a large secondary chisel edge angle, and primary and secondary facets with specified relief angles.

In a second aspect, the present invention provides a twist drill comprising
a shank,
a drill body,
a drill tip, and
at least one flute extending from the drill tip to the drill body,
wherein the drill tip comprises
a cutting edge,
a primary facet extending behind the cutting edge,
a secondary facet extending behind the primary facet, wherein the relief angle of the primary facet is 5° to 40°, preferably 10° to 40°, and the relief angle of the secondary facet is 10° to 40°;
a chisel edge, and
a secondary chisel edge, wherein the secondary chisel edge angle is 120° to 170°.

The combination of a secondary chisel edge and the primary and secondary reliefs as defined above imparts the drill with particularly good performance when drilling composite materials described herein. Indeed, the drill of this aspect is adapted for drilling composite materials containing fibres, for example CFRP and GFRP.

Nevertheless, the drill can be used for drilling other materials, for example steel and aluminium.

A particular advantage of this drill is that good hole quality, especially exit hole quality, can be achieved. Indeed, the present inventors have found that the combination of the secondary chisel edge and primary and secondary reliefs cooperate to reduce the cutting temperature. In particular, by moderating the cutting temperature, the integrity of the matrix of the composite material (typically a resin) can be maintained. This suitably avoids the fibre damage and poor quality holes that are routinely observed with conventional drills.

The optional and preferred features associated with the first aspect also apply to this aspect.

In particular, suitably the helix angle of the or each flute decreases from a start helix angle of 25° to 60°, preferably 40° to 60°, at the drill tip to a finish helix angle of 0° to 35°, preferably 0° to 20°, in the drill body, Preferably the drill has a pilot as defined herein.

In particular, preferably the drill has a first chamfer portion and a second chamfer portion as defined herein, optionally a third chamfer as defined herein.

In particular, preferably the drill has a point angle as defined herein.

In particular, preferably the drill has an axial rake angle as defined herein.

In a third aspect, the present invention provides a twist drill having
a shank,
a drill body,
a pilot having a drill tip comprising
    a cutting edge,
    a primary facet extending behind the cutting edge,
    a secondary facet extending behind the primary facet, wherein the relief angle of the primary facet is 5° to 40°, preferably 10° to 40°, and the relief angle of the secondary facet is 10° to 40°; and
    a chisel edge and a secondary chisel edge, the secondary chisel edge angle being 120° to 170°; and
at least one flute extending from the drill tip to the drill body, wherein the helix angle of the or each flute decreases from a start helix angle of 25° to 60°, preferably 40° to 60°, at the drill tip to a finish helix angle of 0° to 35°, preferably 0° to 20°, in the drill body.

The optional and preferred features associated with the first aspect also apply to this aspect.

In a fourth aspect, the present invention provides a method of drilling composite material comprising fibres, wherein the method includes the step of drilling the composite material using a twist drill according to any one of the first, second or third aspects.

Suitably the composite material is made up of matrix, for example a plastics material (e.g. polymer), ceramic or metal matrix, which is reinforced by fibrous materials, for example carbon fibre or glass fibre.

Suitably the composite material comprises a plastics material matrix, preferably a polymer matrix, suitably a resin matrix. A particularly preferred matrix is selected from polyester, epoxy and bismaleimide (BMI). Especially preferred is an epoxy resin matrix.

Suitably the fibres, which typically function as fibrous reinforcement, are inorganic or organic fibres. Particularly preferred are glass fibres and carbon fibres.

Suitably the composite material is carbon fibre reinforced plastic (CFRP) or glass fibre reinforced plastic (GFRP).

The composite material can be a laminate material, or form part of a laminate material. The laminate material can comprise one or more of a metal layer, glass cloth layer, paint and copper mesh. These layers may be finishing layers.

For example, the laminate material can be a CFRP/Al material, i.e. comprising one or more layers of CFRP and one or more layers of Al. The drilling of such materials is also known as stack drilling.

The laminate material can be manufactured from either dry or pre-impregnated materials. The fibres of the composite material can be continuous or chopped fibres. Methods of manufacturing such materials include vacuum bag moulding, autoclave processing, resin transfer moulding and hand lay-up.

The twist drills of the present invention are also particularly suitable for use with laminates comprising more than two layers, e.g. three, four, five or six layers.

In this connection, reference to a laminate material includes reference to CFRP laminate and the like. For example, such materials can be made by taking fibre in a pre-impregnated stage, and using up to 50 of such plies to make a (e.g. 10 mm) CFRP laminate. In another example, the laminate is made up of chopped fibres, and, whilst there are in principle no layers because the chopped fibre will be incorporated into soft resin which will then cure to form a CFRP material, it is still known in the art as a laminate.

Suitably the composite material is an aircraft component (e.g. wing or fuselage panel), wind turbine component (e.g. wind turbine blade or housing), boat component or vehicle panel (e.g. car body panel). Indeed, the twist drill described herein is adapted for drilling any workpiece that comprises a composite material containing fibres. It can also be used in stack drilling such as CFRP/Aluminium i.e. CFRP/Al, CFRP/Stainless/Al, etc. A further example is sports equipment, where the composite materials are used to provide high strength with low weight.

Preferably the step of drilling comprises hand drilling. That is, preferably the drilling is not automated drilling, for example of the sort that is carried out using a robot arm under computer control. Hand drilling, or manual drilling, requires manual alignment of the drill and application of suitable force by the user. Hand drilling is typically carried out using a portable (i.e. handheld) drilling tool, for example an air gun, power tool, or even a semi-automated drilling kit such as the Quackenbush drilling systems.

The optional and preferred features associated with the first aspect also apply to this aspect.

In a fifth aspect, the present invention provides use of a twist drill according to any one of the first, second and third aspects in a method of hand drilling a composite material as described herein.

As explained above, the twist drills described herein are adapted for hand drilling and embodiments provide significant advantages to the user in terms of lower thrust force and reduced "pushing".

The optional and preferred features associated with the first aspect also apply to this aspect.

In a sixth aspect, the present invention provides a regrinding method comprising the step of regrinding a twist drill so as to form a twist drill according to any one of the first, second and third aspects.

Preferably the method of regrinding includes regrinding the point. In the preferred embodiments where the drill comprises a pilot, suitably the method of regrinding includes regrinding the pilot. A particular advantage of the twist drill comprising a pilot described herein is that a new point can be reground when the original point has become dulled. Suitably, the regrinding method can be carried out two or more times, for example three times, on the same drill.

Suitably the method includes regrinding, where present, one or more of the chisel edge (suitably chisel edge length and/or chisel edge angle), secondary chisel edge (suitably secondary chisel edge angle), primary relief/clearance, secondary relief/clearance and rake angle.

Preferably all of chisel edge, secondary chisel edge, primary relief/clearance, secondary relief/clearance and rake angle are subjected to regrinding.

The optional and preferred features associated with the first aspect also apply to this aspect.

In a seventh aspect, the present invention provides a twist drill that is the product of the regrinding method of the sixth aspect.

In an eighth aspect, the present invention provides a method of making a twist drill according to any one of the first, second and third aspects.

Suitably the method includes the step of machining a blank. Optionally, the method includes forming the blank from a rod, suitably by cutting the rod to the desired length, for example the length of the drill.

Suitably, the blanks are provided with a back taper.

Preferably the method includes the step of grinding at least one flute with a variable helix, typically two flutes.

Suitably the method includes the step of producing the land by forming a body clearance along the or each flute.

Suitably the blank is provided with a pilot portion (e.g. the diameter is reduced at the drill tip). Preferably a chamfer portion is formed between the pilot portion (narrower diameter portion) and the part of the blank that will become the drill body (full diameter portion).

In embodiments, a body clearance is formed at the pilot.

Suitably the method includes the step of forming a second chamfer portion. Preferably body clearance is formed for both the first chamfer portion and the second chamfer portion.

Suitably the method includes the step of pointing, i.e. forming the point. Preferably this step includes forming a primary facet and a secondary facet.

Suitably the primary facet is formed so as to produce a chisel edge, preferably with a chisel edge angle of 105° to 125°. Suitably the primary facet is formed so as to have a relief angle (also known as a clearance or clearance angle) of 5° to 40°, preferably 10° to 40°.

Suitably the secondary facet is formed so as to have a relief angle (also known as a clearance or clearance angle) of 10° to 40°.

Suitably the method includes the step of gashing to create an axial rake angle.

Suitably the axial rake angle is 5° to 15°. Suitably the step of gashing creates a chisel edge length of 0.03 mm to 0.15 mm, preferably 0.05 mm to 0.15 mm.

The optional and preferred features of the other aspects also apply to this aspect. In particular, where those features relate to a twist drill per se, they apply also to this method as a corresponding method step.

In a ninth aspect, the present invention provides a twist drill that is the product of the method of the eighth aspect.

In a tenth aspect, the present invention provides a method of drilling a composite material containing fibres, wherein the method includes the step of drilling the composite material with a twist drill comprising:
- a shank,
- a drill body,
- a drill tip, and
- at least one flute extending from the drill tip to the drill body, wherein the helix angle of the flute decreases from a start helix angle at the drill tip to a finish helix angle in the drill body.

Suitably the composite material is CFRP or GFRP. Suitably it is part of an aircraft, boat, vehicle or wind turbine component as described herein.

Suitably the start helix angle and finish helix angle are as described in the first aspect.

The optional and preferred features associated with the other aspects also apply to this aspect.

In respect of the fourth proposal, the present inventors have identified a combination of features that assist in providing good hole quality, particularly when drilling composite materials as described herein, especially for automated drilling.

In particular, the present inventors have found that the provision of a flute having both a linear section where the helix angle does not vary, and a variable section where the helix angle changes can improve hole quality, particularly exit hole quality, especially for composite materials such as CFRP and the like.

In an eleventh aspect, the present invention provides a twist drill having
- a shank,
- a drill body,
- a drill tip, wherein the drill tip comprises
  - a chisel edge, and
  - a secondary chisel edge, wherein the secondary chisel edge angle is 120° to 170°, and
- at least one flute extending from the drill tip to the drill body, wherein the flute includes a linear portion wherein helix angle is substantially constant and a variable portion wherein the helix angle changes from a start variable helix angle to a finish variable helix angle.

Suitably the helix angle in the variable portion changes continuously, as described herein. Suitably the helix angle decreases from the start variable helix angle to the finish variable helix angle.

Suitably the helix angle of the linear portion is 25° to 60°, preferably 40° to 60°, preferably as described herein.

Suitably the start variable helix angle is 25° to 60°, preferably 40° to 60°, preferably as described herein for the start helix angle of the twist drill of the first aspect.

Suitably the finish variable helix angle is 0° to 35°, preferably 25° to 35°, preferably as described herein for the finish helix angle of the twist drill of the first aspect.

Suitably the variable portion is as described herein in respect of the variable helix of the first aspect.

Suitably the linear portion is as described herein in respect of the linear portion of the first aspect.

Suitably the secondary chisel angle is as described herein in respect of the first aspect.

Preferably the twist drill includes a wider diameter portion, suitably a wider diameter portion comprising a chamfer, as described herein in respect of the first aspect.

In a twelfth aspect, the present invention provides a twist drill having
- a shank,
- a drill body,
- a drill tip comprising
  - a cutting edge,
  - a primary facet extending behind the cutting edge,
  - a secondary facet extending behind the primary facet, wherein the relief angle of the primary facet is 5° to 40°, preferably 10° to 40°, and the relief angle of the secondary facet is 10° to 40°; and
  - a chisel edge and a secondary chisel edge, the secondary chisel edge angle being 120° to 170°; and
- at least one flute extending from the drill tip to the drill body, wherein the flute includes a linear portion wherein helix angle is substantially constant and a variable portion wherein the helix angle changes from a start variable helix angle to a finish variable helix angle.

Suitably the optional and preferred features of the other aspects, especially the first aspect, apply to this aspect.

In a thirteenth aspect, the present invention provides a method of drilling composite material comprising fibres, wherein the method includes the step of drilling the composite material using a twist drill according to the eleventh or twelfth aspects.

Suitably the optional and preferred features of the other aspects, especially the fourth aspect, apply to this aspect.

In a thirteenth aspect, the present invention provides use of a twist drill according to the eleventh or twelfth aspects in a method of automated drilling a composite material as described herein.

Suitably the optional and preferred features of the other aspects, especially the fifth aspect, apply to this aspect.

In a fourteenth aspect, the present invention provides a regrinding method comprising the step of regrinding a twist drill so as to form a twist drill according to the eleventh or twelfth aspect.

Suitably the optional and preferred features of the other aspects, especially the sixth aspect, apply to this aspect.

In a fifteenth aspect, the present invention provides a twist drill that is the product of the regrinding method of the fourteenth aspect.

Suitably the optional and preferred features of the other aspects, especially the seventh aspect, apply to this aspect.

In a sixteenth aspect, the present invention provides a method of making a twist drill according to the eleventh or twelfth aspect.

Suitably the optional and preferred features of the other aspects, especially the eighth aspect, apply to this aspect.

In a seventeenth aspect, the present invention provides a twist drill that is the product of the method of the sixteenth aspect.

Suitably the optional and preferred features of the other aspects, especially the ninth aspect, apply to this aspect.

In an eighteenth aspect, the present invention provides a method of drilling a composite material containing fibres, wherein the method includes the step of drilling the composite material with a twist drill comprising:
- a shank,
- a drill body,
- a drill tip, and
- at least one flute extending from the drill tip to the drill body, wherein the flute includes a linear portion wherein helix angle is substantially constant and a variable portion wherein the helix angle changes from a start variable helix angle to a finish variable helix angle.

Suitably the optional and preferred features of the other aspects, especially the tenth aspect, apply to this aspect.

The optional and preferred features of any one aspect can also apply to any of the other aspects. Furthermore, any one aspect may be combined with one or more of the other aspects. In particular, features disclosed in the context of a product (twist drill) may also apply to a method as a corresponding method step, and vice versa.

BRIEF DESCRIPTION OF THE DRAWINGS

Embodiments of the invention and experiments illustrating the advantages and/or implementation of the invention are described below, by way of example only, with respect to the accompanying drawings, in which.

DETAILED DESCRIPTION OF EMBODIMENTS AND EXPERIMENTS

Figure 1:
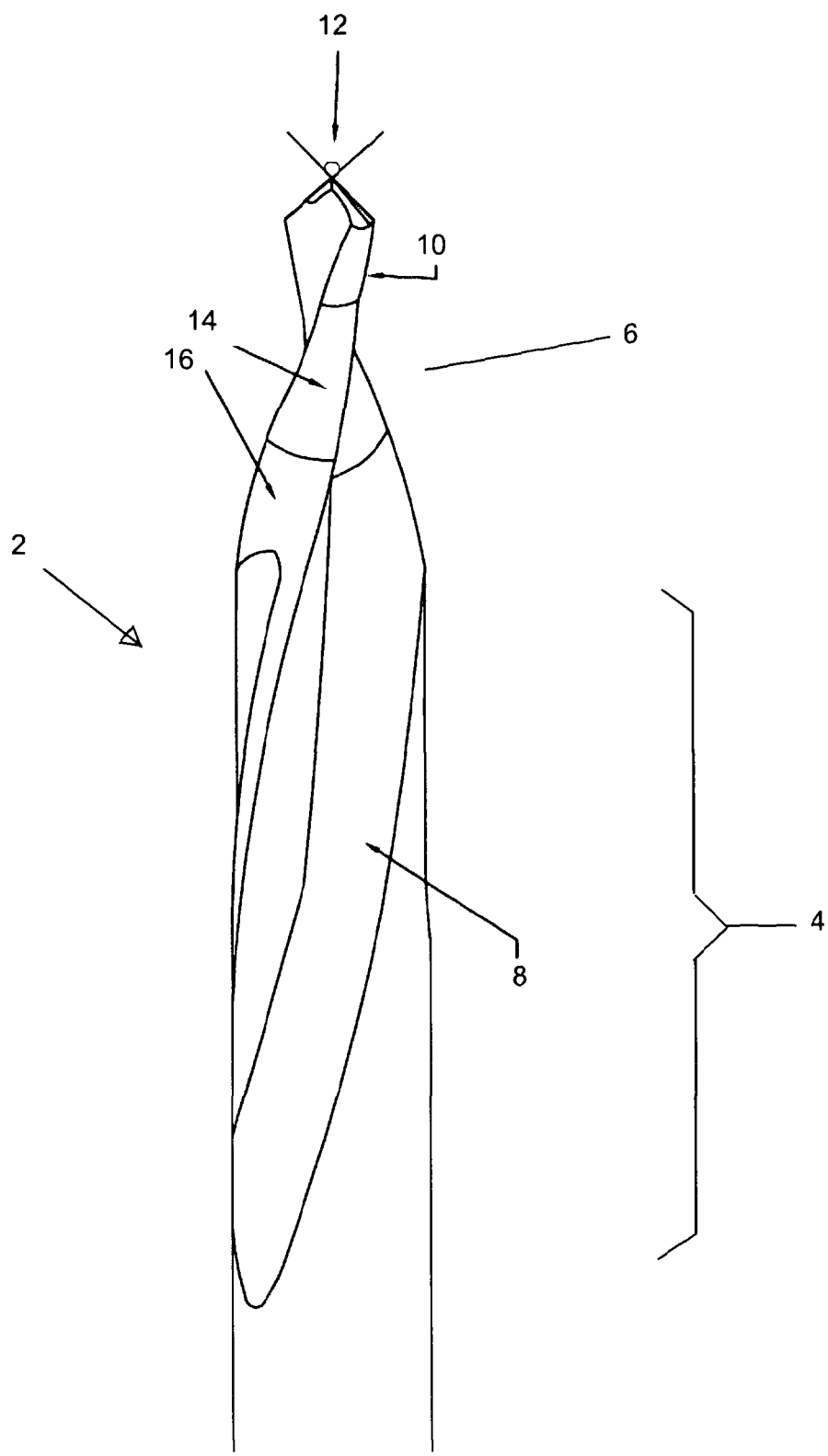
FIG. 1 shows a side view of a variable helix twist drill, being a first embodiment of the present invention.

FIG. 1 shows a twist drill 2 of the present invention. The drill comprises a shank (not shown), drill body 4 and drill tip 6. Two helical flutes 8 extend from the drill tip to the drill body. The helix angle is comparatively large at the start of the helix, being 50° and comparatively small at the end of the helix, being 10°. Other angles are possible, for example 25° to 60°, suitably 40° to 60°, for the start angle, and 0° to 35° for the finish angle.

The helix is formed using a spline function. The spline function is selected so that the change in helix angle as a function of the axial distance from the start of the helix at the drill tip is smooth and continuous. This is in contrast to conventional variable helix drills wherein the change in helix angle is stepped, such that there are transitions or steps between helix angles. In contrast, this embodiment, with its smooth and continuous variation in helix angle does not have any such steps. This has the significant advantage that material is removed and evacuated more efficiently along the flutes.

The width of the flutes is substantially constant along the length of the flutes.

Drill 2 also comprises an extended pilot 10. The primary and secondary cutting edges (cutting lips) at the pilot tip form the point, which has a point angle 12 of 90°. Other point angles are possible, for example 80° to 140°.

The drill 2 comprises a progressive transition between the comparatively narrow pilot 10 and the wider drill body 4. A double chamfer serves to reduce the thrust force and to increase the cutting resistance in order to counteract for the pushing effect that would occur during cutting at the transition point between the chamfer and the drill body. Specifically, the drill 2 comprises a first chamfer 14 having an angle of 15° and a length of 5 mm, and a second chamfer 16 having an angle of 10° and a length of 4 mm, Other chamfer angles and lengths are possible as described herein. Indeed, additional chamfers (i.e. third, fourth, etc chamfers) are possible.

The diameter of the pilot is 47% of the drill diameter. As explained herein, the drill diameter is measured at the widest point of the drill, which in this case is at the forwardmost part of the drill body 4 immediately adjacent the second chamfer 16.

The extended pilot is 3 mm long, measured from a point immediately adjacent the forwardmost part of the first chamfer 14 to a point immediately adjacent the point (i.e. not including the point). Other pilot lengths are possible, for example 2 mm to 6 mm.

The extended pilot can be reground, thereby permitting multiple uses of the same drill. Indeed, up to three regrinds are possible, which represents a considerable cost and material saving for the end user as compared to purchasing new drills.

Figure 2:
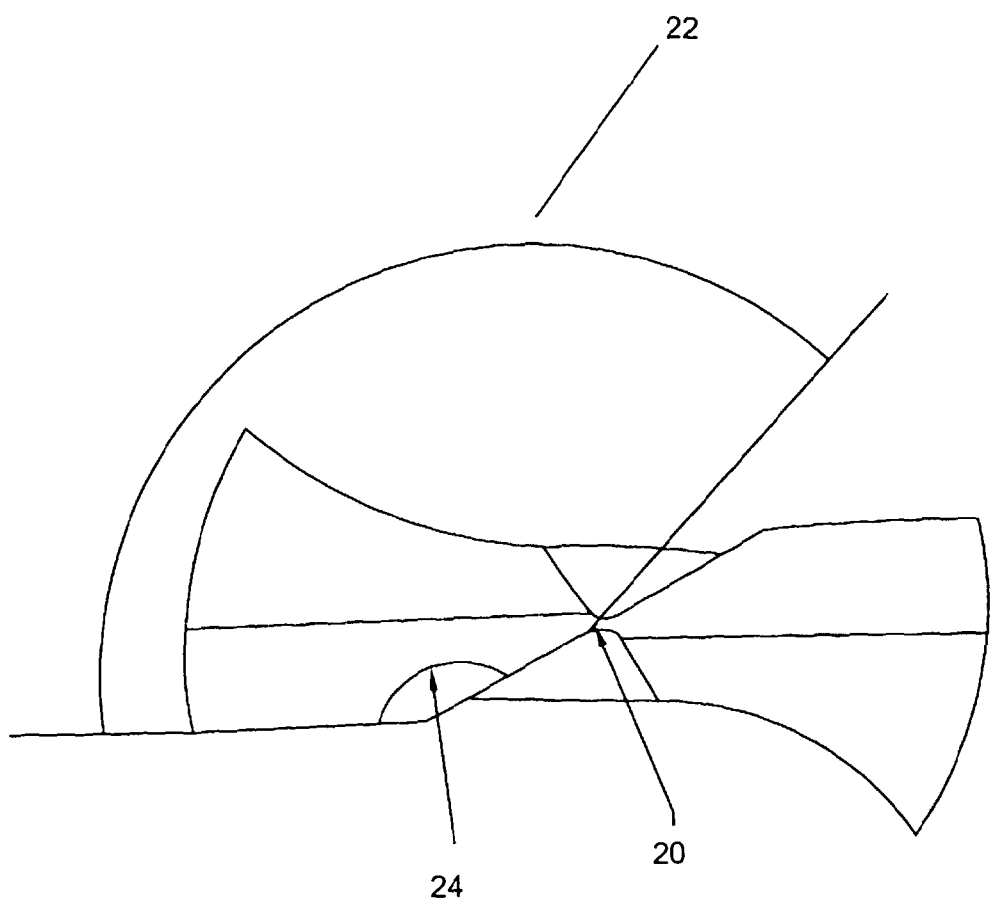
FIG. 2 shows an end-on axial view of the twist drill of FIG. 1.

FIG. 2 shows an axial view of the drill 2. Chisel edge 20 has a length of 0.1 mm and a chisel edge angle 22 of 110°. Other chisel lengths and chisel angles are possible, as described herein.

A characteristic of the drill 2 that makes it particularly effective at drilling composite material containing fibres is a second chisel edge. Furthermore, secondary chisel edge angle 24 is large, being 150°. Other secondary chisel edge angles are possible, for example 120° to 170°.

Figure 3:
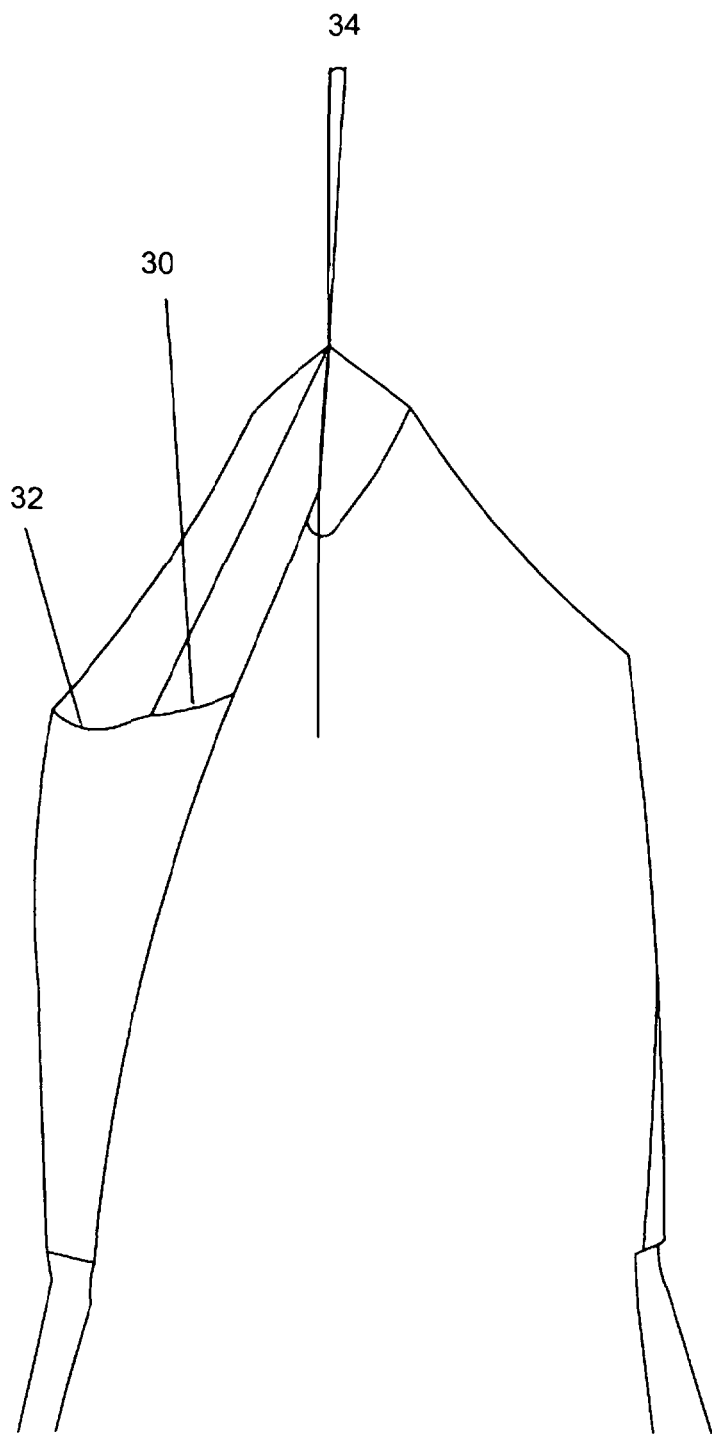
FIG. 3 shows an expanded view of the drill tip of the twist drill of FIG. 1.

FIG. 3 shows an enlarged view of the drill tip 6 and especially the pilot 10. The primary and secondary cutting edges of the point are provided with a primary relief 30 (also known as primary facet or flank face clearance) and secondary relief 32 (also known as secondary facet or flank face clearance). The respective relief angles (also known as clearance) are 10°- and 20° respectively. In another embodiment having otherwise identical geometry, the respective relief angles are 25° and 20°. Other primary and secondary clearance angles are possible, for example 5° to 40° (preferably 10° to)40° and 10° to 40° respectively.

The drill 2 has an axial rake angle of 8°. In another embodiment having otherwise identical geometry, the axial rake angle is 10°. However, other rake angles are possible, for example 3° to 15°.

As described above, the combination of the variable helix, the primary and secondary reliefs and the secondary chisel edge in particular impart the drill with unexpectedly good performance when cutting composite materials such as CFRP. Indeed, a highly desirable combination of low thrust force and excellent exit hole quality (little or no fraying of the material) has been achieved. Furthermore, little or no "pushing" occurs, which makes the drill especially suited for hand drilling.

Testing of Drill Performance

The performance of an embodiment of the present invention was compared with a commercially available hand drill that is marketed for use with CFRP. The drill performance was quantified by measuring thrust force and hole quality.

Drill Geometry

A twist drill was manufactured in accordance with the methods described herein. Specifically, the following steps were undertaken:

1. Rods are cut into desired length which is the length of the drill
2. A first chamfer and a pilot are formed in the blank.
3. Blanks are back tapered.

Using an CNC machine, the following steps were performed:

4. Fluting to form two flutes with variable helix. The variable helix is formed using an exponential spline function. In this way, the helix is smooth and is free of the break points that characterise conventional helices.
5. Fluting land is produced and body clearance is generated along the flute
6. Body clearance is created at the pilot
7. A second chamfer is formed and the body clearance is created both for first and second chamfers.
8. Pointing to create the primary facet and secondary facet. The primary facet is created to have a chisel edge angle of 110° and a primary clearance of 10°. The secondary facet is created to have a secondary clearance of 20°.
9. Gashing is carried out to create a rake angle of 8° and a chisel length of 0.1 mm.

The flute was formed using a spline function, to provide a smooth continuous transition along the drill, from start angle to finish angle.

The completed drill had the following geometry:
Helix length=38 mm
Start helix angle=50°
Finish helix angle=10°
Pilot length=3 mm
Diameter of pilot=47.24% of drill diameter
Point angle=90°
Axial rake angle=8°
Chisel edge angle=110°
Chisel length=0.1 mm.
Secondary chisel angle=150°.
Primary clearance=10°.
Secondary clearance=20°.
Chamfer 1 angle=15°
Chamfer 1 length=5 mm
Chamfer 2 angle=10°
Chamfer 2 length=4 mm This drill is referred to as drill #1 for the purposes of the tests.

Note that, as mentioned above, a further embodiment has identical geometry except for an axial rake angle of 10° and a primary clearance of 25°.

A commercially available hand drill was also tested: Drill #2: Carbide hand tool.

Test Procedures

In order to measure the thrust and the hole quality, two tests were carried out:
(1) Automated drilling for thrust force measurement
(2) Hand drilling for hole quality examination Even though drill #1 is particularly adapted for hand drilling operation, testing using a CNC 4 axis machine was needed for thrust force measurement.

However, for hole quality measurements, hand drilling was carried out.

The test workpiece in each test was an epoxy based CFRP of 10 mm thickness.

For the hole quality test the exit face of the workpiece was provided with a glass scrim. This configuration, which is encountered for example in the aerospace industry, represents a particularly difficult challenge.

The materials, tools and machine employed in the tests are summarised in Table 1 (automated drilling for force measurement) and Table 2 (hand drilling for exit hole quality measurement).

TABLE 1

Materials, tools and machine used in the thrust force test

| Machine | Type | CNC 4 axis machine |
|---|---|---|
|  | Coolant | Dry |
| Materials | Type | Epoxy based CFRP (Material 1) |
|  | Thickness | 10 mm |
| Drills | Diameter | Ø6.35 |
|  | Coating | Bright |
|  | Type | Drill #1, Drill #2 |

TABLE 2

Materials, tools and machine used in the hole quality test

| Hand Tool | Type | Power hand drill |
|---|---|---|
| Materials | Type | Epoxy based CFRP with a glass cloth at the exit face (Material 2) |
|  | Thickness | 10 mm |
| Drills | Diameter | Ø6.35 |
|  | Coating | Bright |
|  | Type | Drill #1, Drill #2 |

Test (1): Thrust Force Measurement

For each drill, ten holes were drilled in Material 1 using a CNC machine. The thrust force was measured and recorded using a Kistler Dynamometer.

Test (2): Hole Quality Determination

For each drill, a number of holes were drilled in Material 2 using a power hand drill.

The hole quality at the exit face was observed and captured using an optical microscope.

Results

Figure 4A:
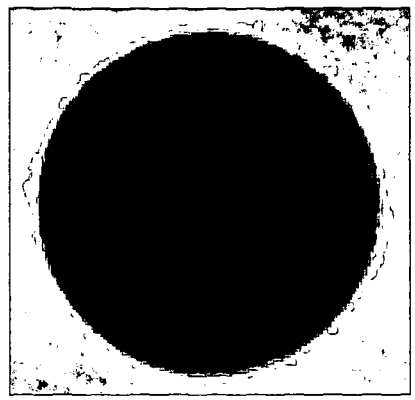
FIGS. 4A and 4B show the results of an exit hole quality test in CFRP material for an embodiment of the present invention (4A), and a commercially available drill (4B)
Figure 4B:
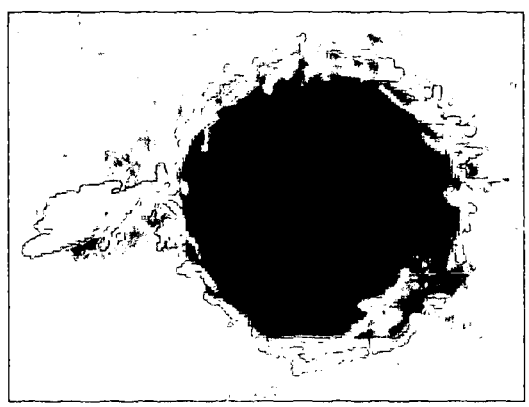

The average computed thrust force and the exit hole captured images are summarised in Table 3. FIGS. 4A and 4B show the captured images for each of the two drills: FIG. 4A is drill #1; and FIG. 4B is drill #2.

Drill #1 achieved not only a low thrust force but also excellent exit hole quality. In contrast, drill #2 demonstrated poor or very poor exit hole quality.

TABLE 3

Test results

|  | Drill #1 | Drill #2 |
|---|---|---|
| Thrust force on Material 1 | 96N | 146N |
| Hole quality on Material 2 | Excellent | Poor |

An additional advantage of drill #1 is that it can be reground. This is attractive to end users because the cost of re-grinding is normally much lower than the cost of a new drill.

Figure 5:
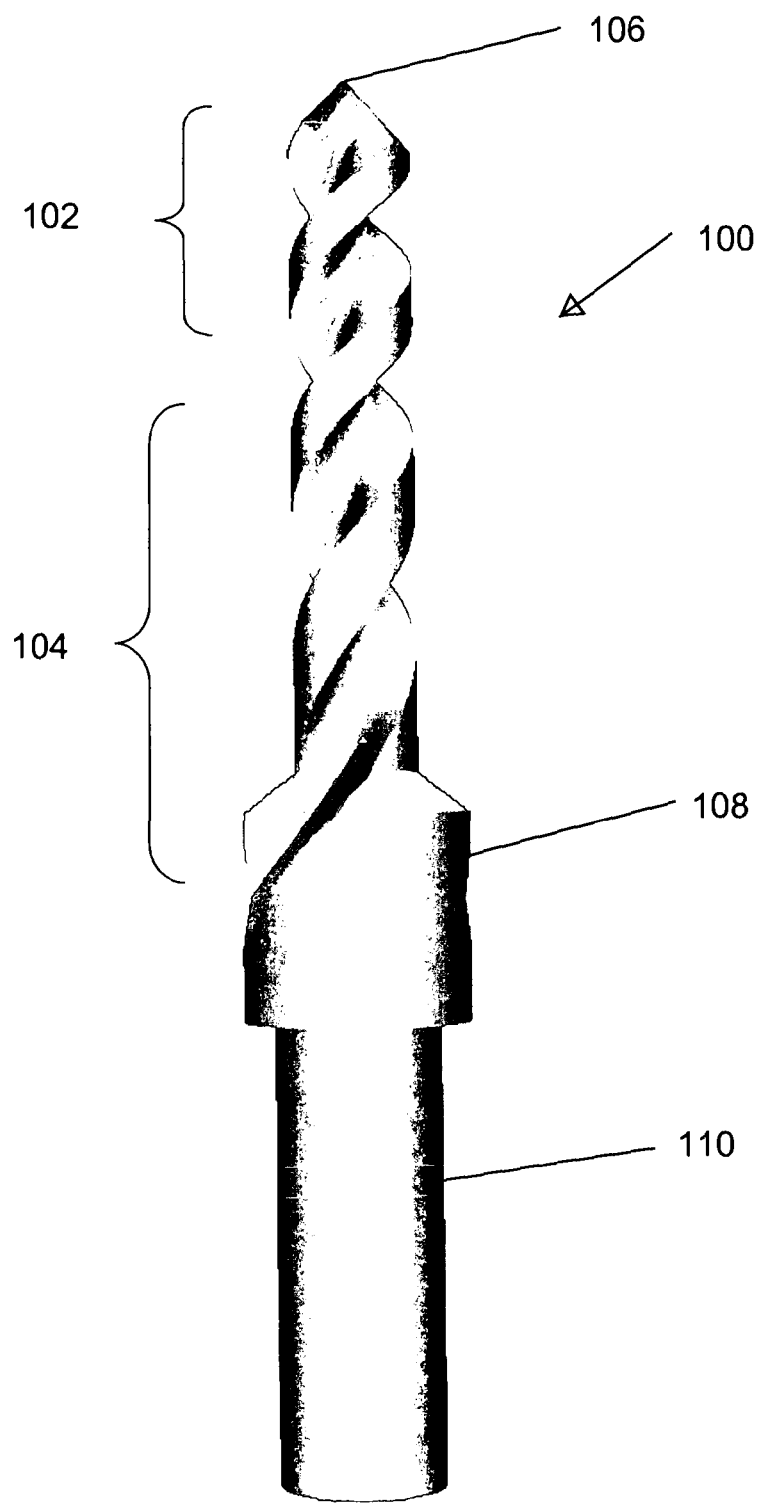
FIG. 5 shows a side view of a variable helix twist drill having a constant helix portion, being a second embodiment of the present invention.

FIG. 5 shows a further embodiment. In this embodiment, drill 100 comprises a helical flute having a linear section 102 in which the helix angle is constant, and a variable section 104 in which the helix angle decreases. In this embodiment, the linear section is about 35-45% of the flute length.

The helix angle in the linear section is 50°, although other "start" angles are possible, for example 25° to 60°, suitably 40° to 60°.

The helix angle in the variable section decreases from 50° (the start angle of the variable helix section) to 30° (the finish angle of the variable helix section). Other finish angles are possible, for example 0° to 35°.

The cutting tip 106 includes a secondary chisel angle of 140°, although other angles are possible, for example 120° to 170°. The drill tip also includes primary and secondary clearances, being 15° and 20° respectively.

The point angle is 85°, and the chisel length is 0.1 mm. The drill tip has an axial rake angle of 5°.

Figure 7A:
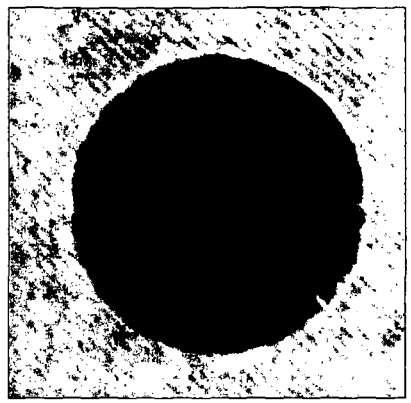
FIGS. 7A and 7B shows the results of an exit hole quality test in CFRP for the embodiment of FIG. 5 (7A) and the embodiment of FIG. 6 (7B).

In testing with CFRP materials, this drill was found to provide very good hole quality. An example of excellent exit hole quality is shown in FIG. 7A. In particular, excellent results in stack machining (e.g. with a stack of 40 mm thickness) was achieved. The drill 100 is particularly suited to automated drilling.

Figure 6:
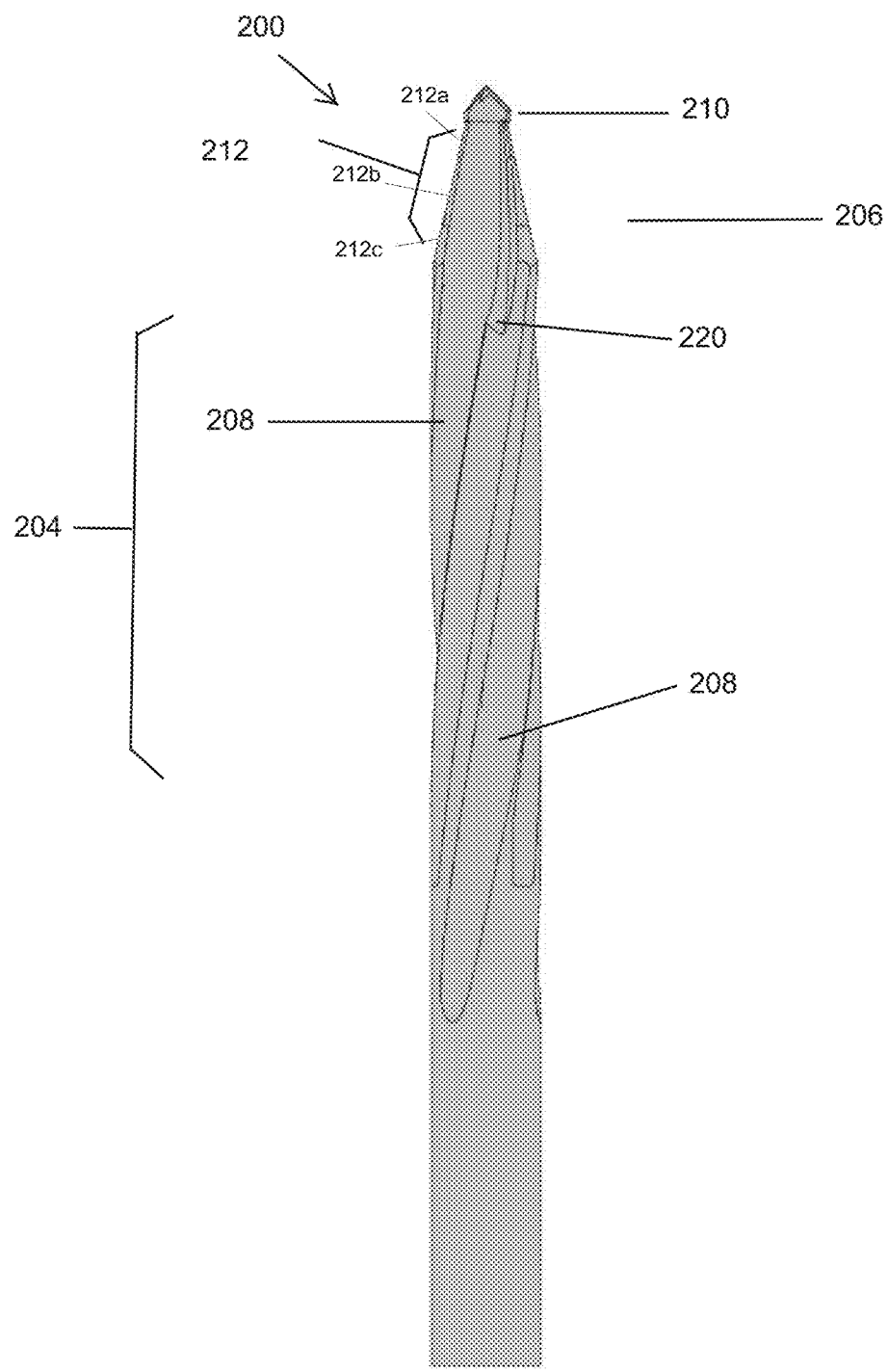
FIG. 6 shows a side view of a variable helix twist drill, being a further embodiment of the present invention.

A further embodiment is shown in FIG. 6.

FIG. 6 shows a twist drill 200 of the present invention. The drill comprises a shank, drill body 204 and drill tip 206. Three helical flutes 208 (only two are visible) extend from the drill tip to the drill body. The helix angle is comparatively large at the start of the helix, being 30° and comparatively small at the end of the helix, being 10°. Other angles are possible, for example 25° to 60° for the start angle, and 0° to 35° for the finish angle.

In the same way as for the example shown in FIG. 1, the helix is formed using a spline function. The spline function is selected so that the change in helix angle as a function of the axial distance from the start of the helix at the drill tip is smooth and continuous, i.e. without steps. This has been found by testing to permit material to be removed and evacuated more efficiently along the flutes.

The width of the flutes is substantially constant along the length of the flutes.

Drill 200 also comprises an extended pilot 210. The primary, secondary and tertiary cutting edges (cutting lips) at the pilot tip form the point, which has a point angle of 90°. Other point angles are possible, for example 80° to 140°.

The drill 200 comprises a progressive transition portion 212 between the comparatively narrow pilot 210 and the wider drill body 204. A triple chamfer 212a, 212b, 212c serves to reduce the thrust force and to increase the cutting resistance in order to counteract for the pushing effect that would occur during cutting at the transition point between the chamfer and the drill body.

The extended pilot is 3 mm long, measured from a point immediately adjacent the forwardmost part of the first chamfer to a point immediately adjacent the point (i.e. not including the point). Other pilot lengths are possible, for example 2 mm to 6 mm.

In the same way as for the example shown in FIG. 1, the extended pilot can be reground, thereby permitting multiple uses of the same drill. Indeed, up to three regrinds are possible, which represents a considerable cost and material saving for the end user as compared to purchasing new drills.

Drill 200 has a diameter of 13 mm. The speed and feed are normally altered to compensate for diameter change in automated drilling. The speed will be reduced for large diameters in order to achieve the same surface speed used in smaller diameters. Higher or lower feed will be used to compensate for speed changes, However, in hand drilling operation, the speed is alterable but the feed is subjected to individual operators. It is difficult to instruct the operators whether to push harder or not to push harder. In order to address this problem associated with larger diameter hand drilling, drill 200 has been provided with an additional cutting edge as compared to the example of FIG. 1 (and hence an additional flute). Experiments have shown that the additional cutting edge helps the tool to engage into the workpiece and cut with little impact on feed.

Drill 200 has also been provided with back edge relief 220. This has been found in testing to significantly reduce the problem of overheating and hence melting of the workpiece. The problem of heat build up has been found to be particularly acute with large diameter drills (especially diameters above 7.8 mm) and the provision of a back edge relief is particularly effective for those large diameter drills. Drill 200 has a back edge relief on each of its 3 lands, i.e. a back edge relief associated with each cutting edge.

A further characteristic of the drill 200 that makes it particularly effective at drilling composite material containing fibres is a second chisel edge (not shown). Furthermore, the secondary chisel edge angle is large, being about 150°. Other secondary chisel edge angles are possible, for example 120° to 170°.

Similar tests to those carried out on the drill of FIG. 1 demonstrated that drill 200 produces very good entry and exit hole quality on carbon fibre composite material (CFRP), including CFRP with twill fibre layout as well as those with uni-directional (UD) fibre layout. It also performed well on CFRP with a glass scrim on the exit face.

Figure 7B:
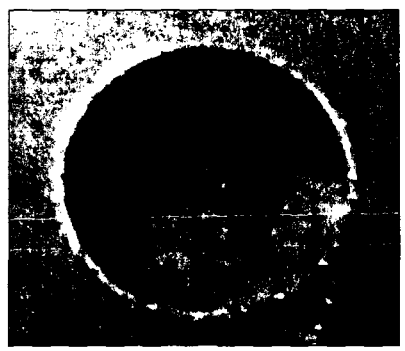

As can be seen from FIG. 7B, exit hole quality is excellent.

The invention claimed is:

1. A twist drill comprising:
   a shank;
   a drill body;
   a drill tip including a pilot, a cutting edge, a primary facet extending behind the cutting edge and a secondary facet extending behind the primary facet, wherein a relief angle of the primary facet is 5° to 40° and a relief angle of the secondary facet is 10° to 40°;

a progressive transition portion between the pilot and the drill body, the progressive transition portion being at least a double chamfer having a first chamfer portion extending from and behind the pilot and a second chamfer portion extending from and behind the first chamfer portion, the first chamfer having a first chamfer portion angle of 12° to 18° and the second chamfer having a second chamfer portion angle of 5° to 15°; and at least one flute extending from the drill tip to the drill body, wherein a helix angle of each flute decreases from a start helix angle of 25° to 60° at the drill tip to a finish helix angle of 0° to 35° in the drill body.

2. The twist drill according to claim 1, wherein the helix angle decreases by at least 10° from the start angle to the finish angle.

3. The twist drill according to claim 1, wherein the start helix angle is 40° to 60°.

4. The twist drill according to claim 1, wherein the finish helix angle is 0 to 20°.

5. The twist drill according to claim 1, wherein the start helix angle is 48° to 52° and the finish helix angle is 8° to 12°.

6. The twist drill according to claim 1, wherein the start helix angle is 28° to 32° and the finish helix angle is 8° to 12°.

7. The twist drill according to claim 1, wherein the helix angle decreases smoothly and continuously from the start helix angle to the finish helix angle.

8. The twist drill according to claim 1, wherein the relief angle of the primary facet is 10° to 40 and the relief angle of the secondary facet is 15° to 30°.

9. The twist drill according to claim 1, wherein the drill has only two flutes.

10. The twist drill according to claim 1, wherein the pilot has a length of at least 2 mm.

11. The twist drill according to claim 1, wherein the transition portion includes a third chamfer portion extending behind the second chamfer portion.

12. The twist drill according to claim 1, wherein the drill tip includes a chisel edge.

13. The twist drill according to claim 12, wherein a chisel edge angle of the chisel edge is 105° to 115°.

14. The twist drill according to claim 12, wherein a length of the chisel edge is 0.03 to 0.15 mm.

15. The twist drill according to claim 12, wherein the drill tip includes a secondary chisel edge.

16. The twist drill according to claim 15, wherein a secondary chisel edge angle of the secondary chisel edge is 145° to 155°.

17. The twist drill according to claim 12, wherein a length of the chisel edge is 0.05 to 0.15 mm.

18. The twist drill according to claim 1, wherein the drill tip has a point angle of 80° to 140°.

19. The twist drill according to claim 18, wherein the drill tip has a point angle of 85° to 95°.

20. The twist drill according to claim 1, wherein the drill tip has an axial rake angle of 6° to 15°.

21. The twist drill according to claim 1, wherein each flute has a right hand helix.

22. The twist drill according to claim 1, further comprising a back edge relief associated with each cutting edge.

23. The twist drill according to claim 1, wherein the relief angle of the primary facet is 15° to 30°.

24. The twist drill according to claim 1, wherein the drill has three flutes.

25. The twist drill according to claim 1, wherein the second chamfer portion has an angle of no more than 80°.

26. A method of drilling a composite material containing fibres, wherein the method includes the step of drilling the composite material with a twist drill comprising:

a shank;

a drill body;

a drill tip including a pilot, a cutting edge, a primary facet extending behind the cutting edge and a secondary facet extending behind the primary facet along a length of the drill tip, wherein a relief angle of the primary facet is 5° to 40° and a relief angle of the secondary facet is 10° to 40°;

a progressive transition portion between the pilot and the drill body, the progressive transition portion being at least a double chamfer having a first chamfer portion extending from and behind the pilot and a second chamfer portion extending from and behind the first chamfer portion, the first chamfer having a first chamfer portion angle of 12° to 18° and the second chamfer having a second chamfer portion angle of 5° to 15°; and at least one flute extending from the drill tip to the drill body, wherein a helix angle of the flute decreases from a start helix angle at the drill tip to a finish helix angle in the drill body.

27. The method according to claim 26, wherein the composite material is carbon fibre reinforced plastic (CFRP) or glass reinforced plastic (GFRP).

28. The method according to claim 27, wherein the composite material is an aircraft component, wind turbine component, boat component or vehicle panel.

29. The method according to claim 27, wherein the step of drilling comprises hand drilling.

30. The method according to claim 27, wherein the method is a method of stack drilling.

31. The method according to claim 27, further comprising the step of regrinding a twist drill.

* * * * *